United States Patent Office
3,755,386
Patented Aug. 28, 1973

3,755,386
PROCESS FOR THE CATALYTIC MIXED OLIGO-
MERIZATION OF 1,3-DIOLEFINS WITH α-UN-
SATURATED ORGANIC COMPOUNDS
Gunther Wilke, Mulheim (Ruhr), and Helmut Bonne-
mann, Essen (Ruhr), Germany, assignors to Studien-
gesellschaft Kohle mbH., Mulheim (Ruhr), Germany
No Drawing. Filed Feb. 5, 1971, Ser. No. 113,100
Claims priority, application Germany, Feb. 7, 1970,
P 20 05 733.4
Int. Cl. C07c 67/00, 3/10, 69/52
U.S. Cl. 260—410.9 R         5 Claims

ABSTRACT OF THE DISCLOSURE

Mixed oligomers are prepared by reacting 1,3-dienes with ethylene or ethylenically unsaturated compounds in the presence of a cycloolefin-cobalt complex catalyst.

BACKGROUND

This instant invention relates to the manufacture of mixed oligomers of 1,3-dienes and ethylene or ethylenically unsaturated compounds by a selective catalytic co-oligomerization using cycloolefin-cobalt complex compounds as catalyst.

Processes for the mixed oligomerization of 1,3-dienes and ethylene or ethylenically unsaturated compounds are known. German Pat. 1,288,087 and Austrian Pat. 232,495 disclose a process using as catalysts CO-free complex compounds of metals of Group VIII of the periodic system. In accordance therewith, butadiene and ethylene are converted mainly into cyclic oligomers and open-chained oligomers, e.g., n-decatriene-1,4,9, are as a rule produced only in low yield of 10 to 20%. However, according to the process of the German Offenlegungsschrift 1,493,221, only cyclic compounds are obtained using the same catalysts.

German Pat. 1,192,640 describes a process for the manufacture of mixed oligomers from 1,3-dienes and acrylic acid esters in the presence of catalysts of iron, cobalt or nickel compounds, wherein however only the open-chained oligomer hepta-4,6-diene-1-acid ethylic acid or the 3-monomethyl or the 5,6-dimethyl compounds were isolated and characterized. The yield of such esters, however, is not satisfactory. The results are, among other things, preferably obtained using a cobalt compound as catalyst component.

If an analogous nickel complex catalyst is used, a triple unsaturated $C_{11}$-acid methyl ester from butadiene and acrylic acid methyl ester is obtained according to the process of French Pat. 1,433,409. However, the selective synthesis of the $C_{11}$-acid ester in accordance with this French patent is not successful if the corresponding cobalt compound is substituted for the nickel compound as is evident from the corresponding German Democratic Republic Pat. 54,688.

If methacrylic acid ester and a sufficient quantity of butadiene is used, the oligomerization by means of the above mentioned nickel complex catalyst according to German patent application P 17 93 503.4 results in a quintuply unsaturated $C_{19}$ ester.

Catalysts of cobalt compounds according to German Offenlegungsschrift 1,493,266 and French Pat. 1,481,339 are on principle produced in the presence of phosphor compounds. The selectivity of such catalysts, however, is not satisfactory.

From the prior art described, it becomes evident that the selectivity of the catalysis and the yields of the desired product are a function of the specific composition of the catalyst.

Except for a general indication, it cannot be necessarily understood from known teachings what composition the catalyst has to have in order to selectively obtain a pre-determined mixed oligomer. Rather, a person skilled in the art encounters contradictions when searching for a suitable process, e.g., cooligomerization of butadiene and acrylic acid ester.

SUMMARY

Surprisingly it was found that the mixed oligomerization of 1,3-dienes, such as butadiene, isoprene and piperylene, or other 1,3-dienes, such as, e.g., octatriene or methyl heptatriene, with ethylene or ethylenically unsaturated compounds into uniform products is feasible, if the reactants are reacted in the presence of cycloolefin-cobalt complex compounds.

DESCRIPTION

As cobalt complex compounds cyclooctenyl cobalt cyclooctadiene complexes have proven useful and are preferred. The same include, e.g., cyclooctenyl cobalt cyclooctadiene, $(C_8H_{13})(C_8H_{12})Co$, cyclooctenyl cyclooctadiene ethylene, $(C_8H_{13})(C_8H_{12})Co(C_2H_4)$, cyclooctenyl cobalt cyclooctadiene propene, $$(C_8H_{13})(C_8H_{12})Co(C_3H_6),$$

cyclooctenyl cobalt cyclooctadiene butene, $$(C_8H_{13})(C_8H_{12})Co(n-C_4H_8),$$

(Lit: Ch. Grard, Dissertation Bochum 1967, p. 69 et seq., S. Otsuka, M. Rossi J. Chem. Soc. (A) 1968, 2630).

A catalyst of this type cooligomerizes, e.g., butadiene and acrylic acid ester into an unsaturated $C_7$-acid ester, n-octatriene or methyl heptatriene and acrylic acid ester into a triple unsaturated $C_{11}$-acid ester.

As suitable 1,3-dienes it is of special advantage to use, in addition to butadiene, isoprene and piperylene, above all 1,3-dienes having additional double bonds, such as, e.g., octatriene or 3-methyl heptatriene.

As comonomer for the 1,3-dienes, ethylene itself or the α-unsaturated ethylenic compounds, e.g., acrylic acid ester, are preferred for the reaction according to the invention.

The process according to the invention is carried out in the presence of inert solvents, such as, e.g., benzene or toluene, ether or saturated paraffin hydrocarbons, at normal pressure or low pressure up to 50 atms. and at temperatures of −20 to +120° C, preferably at 40 to 90° C.

It is advisable to proceed in such a way that the catalyst of the described type is stabilized in, e.g., benzenic solution or suspension at 0 to 10° C. with 1,3-dienes or the catalyst is supplied to a mixture of benzene and 1,3-diene at approx. 0° C.

It is preferred if the reaction is carried out under protective gas such as, e.g., argon or nitrogen. However, it is also possible to react the 1,3-diolefin with the ethylenically unsaturated compound under the action of the catalyst without a protective gas.

The products produced according to this process are raw materials for the detergent industry (fatty acid esters). They are also desired auxiliary materials for the flotation of ores. In the case of such application it is important to use acid esters having a pre-determined C-number within the range of $C_7$ to $C_{15}$. Another application is the use in so-called "ester oils," i.e., as lubricants or lubricant additives for heavy-duty engines.

The following examples are intended to further illustrate the present invention without limiting the same.

GENERAL PROCEDURE FOR THE COOLIGOMERIZATION OF 1,3-DIOLEFINS AND ETHYLENICALLY UNSATURATED COMPOUNDS 50 to 70 cm.$^3$ of, e.g., benzenic catalyst solution are supplied to a three-necked flask with agitator, reflux condenser and dropping funnel, butadiene is fed into the flask at 0° C., thereupon the desired reaction temperature is adjusted and maintained constant at ±2° C. by means of a rod thermostat. The acrylic acid ester is slowly added drop by drop whereby an increase in the butadiene absorption is observed. It is possible to add drop by drop a maximum of approx. 500 millimoles of acrylic acid methyl ester per hour per mg. atom cobalt without deactivating the catalyst. The optimum addition velocity is at approx. 100 to 200 millimoles acrylic acid methyl ester/hr./mg. atom metal.

At the end of the reaction time 1 mg. atom flowers of sulfur/mg. atom metal are added to the mixture at the reaction temperature, precipitating cobalt sulfide from the solution. It is filtered via a G3 filter frit and the reaction mixture is separated by distillation into three fractions:

Fraction I: B.P.$_{0.3}$ 10 to 55° C. (mainly excess starting compounds and solvent)
Fraction II: B.P.$_{0.0001}$ up to 120° C. (C$_7$-acid ester mixture)
Fraction III: residue One specimen is tested each time quantitatively by gas chromatography.

Capillary column: 50 m. polypropylene glycol
Temperature:
    C$_7$ range: 120° C.
    C$_{11}$ range: 140° C.
Carrier gas: argon
Detector: FID

EXAMPLE 1

Used: 310 gms. (3.6 moles) acrylic acid methyl ester butadiene in approx. equivalent amount, 2.76 gms.~10 millimoles (C$_8$H$_{13}$)Co(C$_8$H$_{12}$3 in 50 cm.$^3$ benzene
Reaction temperature: 40° C.
Addition time (drop by drop): 4 hrs.
Acrylic acid methyl ester
Reaction time total: 5 hrs.

In the reaction mixture (443 gms.), 257.3 gms. (1.85 moles) of n-heptadene acid methyl ester were found gas chromatography in addition to unreacted starting compounds. On fractionating as described above, the following fractions are obtained:

Fraction I: 232.0 gms.
Fraction II: 203.7 gms.
Fraction III: 8.1 gms.

Reacted acrylic acid methylester: 1.92 moles, i.e., 58%
Reaction velocity: 40 moles of acrylic acid methyl ester/mole of catalyst/hr.

In the catalytic cooligomerization of butadiene and acrylic acid methyl ester a total of 5 isomeric n-heptadiene acid methyl esters are formed.

In the mass spectrum, all isomers have a molecule peak of 140. Following hydrogenation the 5 isomers coincide quantitatively in a peak of the gas chromatogram with the molecular weight which was found to be 144 and the retention time of which coincides with that of the n-heptane acid ester.

The n-heptadiene acid methyl esters are separated preparatively by gas chromatography. The following analytical data are obtained:

n-heptadiene (trans-4,6)-acid methyl ester (I): B.P.$_{760}$= 180° C., $n_D^{20}$=1.4655

IR data:

Bands of the ester group (C=O at 1735 cm.$^{-1}$, C—O— at 1550–1330 cm.$^{-1}$)
    Bands of the vinyl group at 903 cm.$^{-1}$ (with overtone at 1800 cm.$^{-1}$ 1003 cm.$^{-1}$ and 3185 cm.$^{-1}$
    Bands of the trans-double bond 953 and 3000 cm.$^{-1}$
    Due to the position of the C=C— valency oscillations at 1650 cm.$^{-1}$ and 1602 cm.$^{-1}$ the double bonds are in conjugation.
    On the basis of the comparison with similar esters, the carbonyl band is to be assigned to a nonconjugated C=O— group.

UV data: Main bands at 223 nm., with extinction 25.000 1 mol$^{-1}$ cm.$^{-1}$ n-heptadiene-(trans-2, cis-5)-acid methyl ester (II): B.P.$_{760}$=187° C., $n_D^{20}$=1.4598

IR data:

C=O at 1725 cm.$^{-1}$ and C=C— bands at 1650 cm.$^{-1}$
    Conjugation of C=O and C=C— linkage
    A vinyl linkage does not occur.
    Broad bands at 700 cm.$^{-1}$: cis-double bond. The trans-double bond occurs at 985 cm.$^{-1}$, the short-wave position pointing to a conjugation with C=O—bond.

COMPOSITION OF THE REACTION PRODUCT

| Weight, gm. | Millimoles | Percent yield calculated on reacted acrylic ester | Product |
|---|---|---|---|
| 8.952 | 63.9 | 3.3 | n-Heptadiene acid methyl ester (III). |
| 12.992 | 92.8 | 4.8 | n-Heptadiene acid methyl ester (IV). |
| 70.403 | 502.9 | 26.2 | n-Heptadiene-(trans-4,6)-acid methyl ester (I). |
| 159.497 | 1,139.3 | 59.5 | n-Heptadiene-(trans-2,cis-5) acid methyl ester (II). |
| 5.50 | 39.3 | 2.0 | n-Heptadiene acid methyl ester (V). |
| Total | | 95.8 | |

EXAMPLE 2

Carried out in the same manner as Example 1.
Used:
    146 gms. (1.7 moles) acrylic acid methyl ester
    108 gms. (2.0 moles) liquid butadiene (butadiene was added drop by drop in liquid form from a dosing funnel with cooling jacket)
    1.52 gms. (5 millimoles) (C$_8$H$_{13}$)(C$_8$H$_{12}$)Co(C$_2$H$_4$) in 50 cm.$^3$ benzene
Reaction temperature: 50° C.
Addition time (drop by drop): 5 hrs.
Acrylic acid methyl ester
Reaction time total: 12 hrs.

In the reaction mixture (209.0 gms.) 151.5 gms. (1.08 moles) of n-heptadiene acid methyl ester were found gas chromatographically in addition to unreacted starting compounds. Fractionation of the reaction mixture was carried out as in Example 1:

Fraction I: 35.0 gms.
Fraction II: 166.8 gms.
Fraction III: 7.2 gms.

Reacted acrylic acid methyl ester: 1.209 moles=71%
20 moles of acrylic acid methyl ester/mole of catalyst/hr.

COMPOSITION OF THE REACTION PRODUCT

| Weight, gm. | Milli-moles | Percent yield calculated on reacted acrylic ester | Product |
|---|---|---|---|
| 0.6672 | 4.7 | 0.4 | n-Heptadiene acid methyl ester (III). |
| 3.7046 | 26.46 | 2.2 | n-Heptadiene acid methyl ester (IV). |
| 9.2872 | 66.34 | 5.4 | n-Heptadiene-(trans-4,6)-acid methyl ester (I). |
| 137.7932 | 948.24 | 81.4 | n-Heptadiene-(trans-2,cis-5)-acid methyl ester (II). |
| 5.5044 | 39.32 | 3.8 | n-Heptadiene acid methyl ester (V). |
| Total |  | 92.7 |  |

EXAMPLE 3

Carried out in the same manner as Example 2.

Used:
  344 gms. (4.0 moles) acrylic acid methyl ester
  270 gms. liquid butadiene
  4.96 gms.~18 millimoles $(C_8H_{13})Co(C_8H_{12})$ in 60 cm.$^3$ benzene
  Reaction temperature: 60° C.
  Addition time (drop by drop): 2.5 hrs.
  Acrylic acid methyl ester
  Reaction time total: 4.5 hrs.

In the reaction mixture (533.8 gms.) 4.71 gms. (3.37 moles) of n-heptadiene acid methyl ester were found gas chromatographically in addition to unreacted starting compounds. On fractionating according to Example 1 the following fractions are obtained:

Fraction I: 53.0 gms.
  Fraction II: 473.3 gms.
  Fraction III: 7.5 gms.

Reacted acrylic acid methyl ester: 3.45 moles=86.5%

42 moles of acrylic acid ester/mole of catalyst/hr.

COMPOSITION OF THE REACTION PRODUCT

| Weight, gm. | Milli-moles | Percent yield calculated on reacted acrylic ester | Product |
|---|---|---|---|
| 21.0 | 150.27 | 4.4 | n-Heptadiene acid methyl ester (III). |
| 3.3 | 23.66 | 0.7 | n-Heptadiene acid methyl ester (IV). |
| 38.9 | 278.08 | 8.0 | n-Heptadiene-(trans-4,6)-acid methyl ester (I). |
| 401.4 | 2866.87 | 83.2 | n-Heptadiene-(trans-2,cis-5)-acid methyl ester (II). |
| 7.1 | 50.71 | 1.5 | n-Heptadiene acid methyl ester (V). |
| Total |  | 97.8 |  |

EXAMPLE 4

Carried out in the same manner as Example 2.

Used:
  215 gms. (2.5 moles) acrylic acid methyl ester
  162 gms. (3.0 moles) liquid butadiene
  3.18 gms. (10 millimoles) $(C_8H_{13})(C_8H_{12})Co(C_3H_6)$ in 50 cm.$^3$ THF
  Reaction temperature: 60° C.
  Addition time (drop by drop): 3 hrs.
  Reaction time: 4 hrs.

In the reaction mixture (302.7 gms.) 236.2 gms. (1.69 moles) of n-heptadiene acid methyl ester were found in addition to unreacted starting compounds. On fractionating according to Example 1 the following fractions are obtained:

Fraction I: 164.4 gms.
  Fraction II: 133.1 gms.
  Fraction III: 5.2 gms.

Reacted acrylic acid methyl ester: 1.69 moles=67.6%

43 moles of acrylic acid methyl ester/mole of catalyst/hr.

COMPOSITION OF THE REACTION PRODUCT

| Weight, gm. | Milli-moles | Percent yield calculated on reacted acrylic ester | Product |
|---|---|---|---|
| 0.7 | 5.3 | 0.3 | n-Heptadiene acid methyl ester (III). |
| 0.6 | 4.2 | 0.2 | n-Heptadiene acid methyl ester (IV). |
| 27.3 | 195.1 | 11.4 | n-Heptadiene-(trans-4,6)-acid methyl ester (I). |
| 206.2 | 1,477.1 | 86.3 | n-Heptadiene-(trans-2,cis-5)-acid methyl ester (II). |
| 1.4 | 10.0 | 0.6 | n-Heptadiene acid methyl ester (V). |
| Total |  | 98.8 |  |

EXAMPLE 5

Carried out in the same manner as Example 2.

Used:
  258 gms. (3.0 moles) acrylic acid methyl ester
  178 gms. (3.3 moles) liquid butadiene
  3.3 gms. (10 millimoles) $(C_8H_{13})(C_8H_{12})(C_4H_8)$ in 50 cm.$^3$ hexane
  Reaction temperature: 60° C.
  Addition time (drop by drop): 4 hrs.
  Reaction time: 5 hrs.

In the reaction mixture (408.2 gms.), 236.4 gms. (1.68 moles) of n-heptadiene acid methyl ester were found gas chromatographically in addition to unreacted starting compounds. On fractionating according to Example 1 the following fractions are obtained:

Fraction I: 109.2 gms.
  Fraction II: 293.7 gms.
  Fraction III: 5.3 gms.

Reacted acrylic acid methyl ester: 1.945 moles=65%

37 moles of acrylic acid methyl ester/mole of catalyst/hr.

COMPOSITION OF THE REACTION PRODUCT

| Weight, gm. | Milli-moles | Percent yield calculated on reacted acrylic ester | Product |
|---|---|---|---|
| 5.7 | 40.9 | 2.1 | n-Heptadiene acid methyl ester (III). |
| 1.4 | 10.2 | 0.5 | n-Heptadiene acid methyl ester (IV). |
| 19.9 | 142.0 | 7.3 | n-Heptadiene-(trans-4,6)-acid methyl ester (I). |
| 207.9 | 1482.0 | 76.2 | n-Heptadiene-(trans-2,cis-5)-acid methyl ester (II). |
| 1.5 | 10.5 | 0.5 | n-Heptadiene acid methyl ester (V). |
| Total |  | 86.6 |  |

EXAMPLE 6

Cooligomerization of isoprene and acrylic acid methyl ester as in Example 1.

Used:
  68 gms. (1 mole) of isoprene
  86 gms. (1 mole) of acrylic acid methyl ester
  8.5 gms.~30 millimoles $(C_8H_{13})Co(C_8H_{12})$ in 50 cm.$^3$ benzene
  Reaction temperature: 30° C.
  Reaction time: 4 hrs.

In the reaction mixture, 202.9 gms., the following products were found gas chromatographically:
- 10.7 gms. (69 millimoles) of methyl heptadiene acid methyl ester (I–IV)
- 4.3 gms. (28 millimoles) of methyl cyclohexene carboxylic acid methyl ester (V, VI)

Fraction yields:
- Fraction I: 140.3 gms.
- Fraction II: 47.4 gms.
- Fraction III: 15.2 gms. (residue)

Reacted acrylic acid methyl ester: 147 millimoles=14.7%

1.2 moles of acrylic acid methyl ester/mole of catalyst/hr.

Reacted isoprene: 112 millimoles=11.2%

In the mass spectrum all isomers (I–IV) show a molecule peak of 154. Following the hydrogenation I and II, III and IV coincide by pairs quantitatively in two peaks of the gas chromatogram, the molecular weights of which were determined as 158. V and VI (molecular weight—154) are hydrogenated into 2 isomeric methyl cyclohexene carboxylic acid methyl esters (molecular weight 158).

COMPOSITION OF THE REACTION PRODUCT

| Weight, gm. | Milli-moles | Percent yield calculated on reacted acrylic ester | Product |
|---|---|---|---|
| 7.3 | 47 | 32 | Methyl heptadiene acid methyl ester (I, II). |
| 3.3 | 22 | 15 | Methyl heptadiene acid methyl ester (III, IV). |
| 4.3 | 28 | 19 | Methyl cyclohexene carboxylic acid methyl ester (V, VI). |

EXAMPLE 7

Cooligomerization of piperylene and acrylic acid methyl ester as Example 6.

Used:
- 63.9 gms. (94 millimoles) of piperylene
- 9.5 gms. (110 millimoles) of acrylic acid methyl ester
- 2.76 gms.~10 millimoles $(C_8H_{13})Co(C_8H_{12})$ in 30 cm.$^3$ benzene
- Reaction temperature: 40° C.
- Reaction time: 3 hrs.

In the reaction mixture, 104.0 gms., the following products were found gas chromatographically:

3.9 gms. (25 millimoles) of n-octadiene acid methyl ester (I–III)

1.1 gms. (7 millimoles) of methyl heptadiene acid methyl ester (IV–VI)

Fractionation yields:
- Fraction I: 37.1 gms.
- Fraction II: 60.7 gms.
- Fraction III: 6.2 gms.

Reacted acrylic acid methyl ester: 38 millimoles=34.5%

1.3 moles of acrylic acid methyl ester/mole of catalyst/hr.

Reacted piperylene: 43 millimoles=45.8%

In the mass spectrum the isomers I–VI show a molecule peak of 154. Following the hydrogenation of I to II coincide in a peak of the gas chromatogram the molecular weight of which was determined as 158 and the retention time of which coincides with that of the n-octane acid methyl ester. III and IV can be hydrogenated into a methyl heptane acid methyl ester (molecular weight 158).

COMPOSITION OF THE REACTION PRODUCT

| Weight, gm. | Milli-moles | Percent yield calculated on reacted acrylic ester | Product |
|---|---|---|---|
| 3.9 | 25 | 66 | n-Octadiene acid methyl ester (I–III). |
| 1.1 | 7 | 18.5 | Methyl heptadiene acid methyl ester (IV–VI). |

EXAMPLE 8

Cooligomerization of 3-methyl heptatriene-(1,4,6-trans) and acrylic acid methyl ester as in Example 6.

Used:
- 108 gms. (1 mole) 3-methyl heptatriene-1,4,6-(trans)
- 86 gms. (1 mole) acrylic acid methyl ester
- 5.5 gms. (20 millimoles) $(C_8H_{13})Co(C_8H_{12})$ in 30 cm.$^3$ benzene
- Reaction temperature: 80° C.
- Reaction time: 20 hrs.

Reacted acrylic acid methyl ester: 645 millimoles=65%

16 moles of acrylic acid methyl ester/mole of catalyst/hr.

Reacted 3-methyl heptatriene: 624 millimoles=62%

In the reaction mixture, 220.4 gms., the following products were found gas chromatographically:

95.1 gms. (490 millimoles) of methyl decatriene acid methyl ester (I–IV)

8.3 gms. (43 millimoles) of highly branched undecatriene acid methyl ester (V)

In the mass spectrum the isomer I–IV show a molecule peak of 194 and following the hydrogenation they coincide in a peak of the gas chromatogram (molecular weight 200). V (molecular weight 194) shows after the hydrogenation (molecular weight 200) a considerably reduced retention time. It may be concluded therefrom that this product has a highly branched structure.

COMPOSITION OF THE REACTION PRODUCT

| Weight, gm. | Milli-moles | Percent yield calculated on reacted acrylic ester | Product |
|---|---|---|---|
| 95.1 | 490 | 76 | Methyl decatriene acid methyl ester (I–IV). |
| 8.3 | 43 | 6.7 | Highly branched undecatriene acid methyl ester (V). |

EXAMPLE 9

Cooligomerization of n-octatriene and acrylic acid methyl ester into undecatriene acid methyl ester.

The preparation, execution and work-up was done analogous to Example 1, but the n-octatriene was present from the outset. The n-octatriene used contained between 10 and 35% of vinyl cyclohexene as impurity which participates in the reaction to a subordinated degree and therefore has to be taken into account on preparing the balance.

Used:
- 86 gms. (1 mole) of acrylic acid methyl ester
- 108 gms. (1 mole) of n-octatriene
- 20.6 gms. (190 millimoles) of 4-vinyl cyclohexene
- 3.3 gms.~12 millimoles $(C_8H_{13})Co(C_8H_{12})$ in 70 cm.$^3$ benzene
- Reaction temperature: 80° C.
- Reaction time: 28 hrs.

In the reaction mixture, 272.0 gms., the following products were found gas chromatographically:

109.9 gms. (566.1 millimoles) of undecatriene acid methyl ester (I–III)

26.3 gms. (135.3 millimoles) of cyclic $C_{11}$-ester (IV and V)

11.3 gms. (4.1 millimoles) of butenyl cyclohexene carboxylic acid methyl ester (VI)

Following the hydrogenation the isomers II and III coincide in a peak of the gas chromatogram (molecular weight 200), which was identified as n-undecane acid methyl ester when compared with an authentic sample. Following the hydrogenation (molecular weight 200) I was identified as 4-ethyl nonane acid methyl ester. IV and V absorb 2 moles of hydrogen during hydrogenation, hence have a cyclic structure (of vinyl cyclohevene). VI was identified as butenyl cyclohexene carboxylic acid methyl ester when comparing the retention time with an authentic sample.

Fractionation according to Example 1 yields:

Fraction I: 95.5 gms.
Fraction II: 168.2 gms.
Fraction III: 8.3 gms.

| Conversion | Acrylic acid methyl ester | n-octatriene | vinylcyclohexene |
|---|---|---|---|
| millimoles | 776.3 | 868.5 | 129.1 |
| % | 77.6 | 86.8 | 68.0 |

Reaction velocity: 2.3 moles of acrylic acid methyl ester/mole of catalyst/hr.

COMPOSITION OF THE REACTION PRODUCT

| Weight, gm. | Milli-moles | Percent yield calculated on reacted acrylic ester | Octa-triene | Vinyl | Product |
|---|---|---|---|---|---|
| 10.6 | 54.6 | 7.0 | 6.3 | | Iso-undecatriene acid methyl ester (I). |
| 36.3 | 186.4 | 66.0 | 59.0 | | n-Undecatriene acid methyl ester (II and III). |
| 63.1 | 325.1 | | | | |
| 24.6 | 126.6 | 16.3 | | 98.1 | Cyclochexenyl pentene acid methyl ester (IV and V). |
| 1.7 | 8.7 | | | | |
| 11.3 | 58.1 | 7.5 | 6.7 | | Butenyl cyclohexene carboxylic methyl ester (V). |

General procedure for the cooligomerization of butadiene and ethylene

Approx. 10 to 20 cm.³ of, e.g., toluenic solution of the catalyst are brought together with butadiene at −18° C. in an ampoule, resulting in a brownish red homogeneous solution. Same is sucked into an evacuated stirrer autoclave cooled to −20° C. of 1,000 cm.³ capacity, and liquid butadiene is fed in. Thereupon ethylene from a steel bottle is pressed on, if necessary the initial pressure is adjusted at 30 atms. at −15° C. by adding inert gas under pressure, and the autoclave is mechanically agitated. The reaction temperature is maintained constant at −15°±2° C. by means of refrigerating machine.

At the end of the reaction time of 68 hrs. the reaction mixture is led into to a two-necked flask cooled to −78° C. The dissolved liquified gases are separated up to a head temperature of ±0° C.

In order to destroy the catalyst, 1.0 gm. atom finely divided flowers of sulfur are added to the mixture per gm. atom cobalt and the quantitatively precipitated cobalt sulfide is removed within 2 hrs. on a G3 filter frit. Now the reaction produce is separated into 4 fractions by distillation:

Fraction I: B.P.$_{760}$ up to 66° C.
Fraction II: B.P.$_{760}$ up to 117° C.
Fraction III: B.P.$_{0.8}$ up to 138° C.
Fraction IV: residue One sample of each is tested quantitatively by gas chromatography.

Conditions:
Capillary column: 100 m. Squalan
Temperature: 23° C.
Carrier gas: argon
Detector: FID

EXAMPLE 10

Used:
405 gms. (7.5 moles) butadiene
280 gms. (1.0 mole) ethylene
15.2 gms. (50 millimoles) $(C_8H_{13})(C_8H_{12})Co(C_2H_4)$ in 60 cm.³ toluene
Reaction temperature: −15° C.
Reaction time: 3 hrs.

In the reaction mixture, 122.6 gms., the following products were found gas chromatographically in addition to unreacted starting compounds:

101.2 gms. (1.233 moles) hexadiene (I–III), which were identified by means of their reaction indices and refraction indices by comparing with authentic samples.

Fractionation yields:
Fraction I: 106.2 gms.
Fraction II: 8.0 gms.
Fraction III: 0.3 gms.
Fraction IV: 8.1 gms.
Reacted butadiene: 69.5 gms. (1,278.7 millimoles)
Reaction velocity: 9 moles of butadiene/mole of catalyst/hr.

COMPOSITION OF THE REACTION PRODUCT

| Weight, gm. | Millimoles | Percent yield calculated on reacted butadiene | Product |
|---|---|---|---|
| 40.0 | 489 | 39.8 | Hexadiene-(1,4) (I). |
| 60.0 | 732 | 58.4 | Hexadiene-(1,3) (II). |
| 1.08 | 12 | 0.9 | Hexadiene-(2,4) (III). |

EXAMPLE 11

Carried out in the same manner as Example 10.

Used:
299 gms. (5.5 moles) butadiene
140 gms. (5.0 moles) ethylene
8.3 gms. (25 millimoles) $(C_8H_{13})Co(C_8H_{12})$ in 60 cm.³ toluene
Reaction temperature: −15° C.
Reaction time: 4 hrs.

In the reaction mixture, 90.3 gms., the following product was found gas chromatographically in addition to unreacted starting compounds: 69.5 gms. (848 millimoles) of hexadienes.

The separation by distillation yielded:
Fraction I: 58.9 gms.
Fraction II: 4.3 gms.
Fraction III: 2.1 gms.
Fraction IV: 4.2 gms.
Reacted butadiene: 47.7 gms. (886 millimoles)
Reaction velocity: 8.9 moles of butadiene/mole of catalyst/hr.

COMPOSITION OF THE REACTION PRODUCT

| Weight, gm. | Millimoles | Percent yield calculated on reacted butadiene | Product |
|---|---|---|---|
| 26.3 | 321 | 36.2 | Hexadiene-(1,4) (I). |
| 31.8 | 388 | 43.8 | Hexadiene-(1,3) (II). |
| 11.4 | 139 | 15.7 | Hexadiene-(2,4) (III). |

What is claimed is:

1. Process for the catalytic mixed oligomerization of 1,3-diolefins selected from the group consisting of butadiene, alkyl butadiene, octatriene and heptatriene with an acrylic acid ester or ethylene which comprises reacting the monomeric mixture in the presence of a cyclooctenyl-cobalt-cyclooctadiene complex wherein the cobalt has a valency of one as a catalyst.

2. Process according to claim 1 wherein cyclooctenyl-cobalt-cyclooctadiene is used as the catalyst.

3. Process according to claim 1 wherein cyclooctenyl-cobalt-cyclooctadiene ethylene is used as the catalyst.

4. Process according to claim 1 wherein cyclooctenyl-cobalt-cyclooctadiene propene is used as the catalyst.

5. Process according to claim 1 wherein cyclooctenyl-cobalt-cyclooctadiene butene is used as the catalyst.

References Cited

UNITED STATES PATENTS 3,432,530  3/1969  Wilke _____ 260—429

FOREIGN PATENTS 1,014,541  12/1965  Great Britain.

OTHER REFERENCES

R. Otsuka et al., J. Chem. Soc. (A) 1968, pp. 2630–33.

LEWIS GOTTS, Primary Examiner

D. G. RIVERS, Assistant Examiner

U.S. Cl. X.R.

260—486 R, 486 L, 666 B, 680 B

UNITED STATES PATENT OFFICE
CERTIFICATE OF CORRECTION

Patent No. 3,755,386　　　　　Dated August 28, 1973

Inventor(s) Gunther Wilke and Helmut Bonnemann

It is certified that error appears in the above-identified patent and that said Letters Patent are hereby corrected as shown below:

Column 5, line 13 (tabulation in box), third column under "Percent yield ... acrylic ester"

"3.8" should read --3.3--.

\* \* \* \* \* \* \*

Column 3, line 63, "methylester" should read -- methyl ester --;

Column 9, line 10, "meehyl" should read -- methyl --;

Column 9, line 12, "cyclohevene" should read -- cyclohexene --.

Signed and sealed this 12th day of March 1974.

(SEAL)
Attest:

EDWARD M. FLETCHER, JR.　　　C. MARSHALL DANN
Attesting Officer　　　　　　　Commissioner of Patents

UNITED STATES PATENT OFFICE
CERTIFICATE OF CORRECTION

Patent No. 3,755,386      Dated August 28, 1973

Inventor(s) Gunther Wilke et al

It is certified that error appears in the above-identified patent and that said Letters Patent are hereby corrected as shown below:

Column 3, line 48, the formula should read
-- $(C_8H_{13})Co(C_8H_{12})$ --

Column 3, line 54, "n-heptadene" should read
-- n-heptadiene --

Column 5, line 12, "948.24" should read -- 984.24 --

Column 6, line 32, the formula should read
-- $(C_8H_{13})$ $(C_8H_{12})Co(C_4H_8)$ --

Column 9, line 40, "Cyclochexenyl" should read
-- Cyclohexenyl --

Column 9, line 67, "produce" should read
-- product -- .

Signed and sealed this 30th day of July 1974.

(SEAL)
Attest:

McCOY M. GIBSON, JR.
Attesting Officer

C. MARSHALL DANN
Commissioner of Patents